(12) United States Patent
Yamamoto

(10) Patent No.: US 6,592,727 B2
(45) Date of Patent: Jul. 15, 2003

(54) PRODUCTION APPARATUS OF HYPOCHLORITE SOLUTION

(75) Inventor: Mikio Yamamoto, Aichi-ken (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 74 days.

(21) Appl. No.: 09/861,891

(22) Filed: May 22, 2001

(65) Prior Publication Data

US 2002/0008040 A1 Jan. 24, 2002

(51) Int. Cl.[7] .................................................. C25B 9/00
(52) U.S. Cl. ........................................ 204/263; 204/266
(58) Field of Search ................................ 204/263, 266; 205/500

(56) References Cited

U.S. PATENT DOCUMENTS

| | | | | |
|---|---|---|---|---|
| 4,308,123 A | * | 12/1981 | Lynn | ........................ 204/263 X |
| 5,567,283 A | * | 10/1996 | Lynn et al. | ............. 204/263 X |
| 5,965,009 A | * | 10/1999 | Shimamune et al. | ... 204/263 X |

FOREIGN PATENT DOCUMENTS

JP          42077          4/1992

* cited by examiner

*Primary Examiner*—Donald R. Valentine
(74) *Attorney, Agent, or Firm*—Arent Fox Kintner Plotkin & Kahn, PLLC

(57) ABSTRACT

A production apparatus of hypochlorite solution includes an electrolytic cell having a housing the interior of which is subdivided by a partition membrane to form therein anode and cathode chambers, and positive and negative electrodes respectively disposed within the anode and cathode chambers and opposed to each other through the partition membrane, wherein the positive and negative electrodes are applied with DC voltage to effect electrolysis of chloride solution such as sodium chloride solution or potassium chloride solution supplied into both the anode and cathode chambers, and wherein acid water and alkaline water respectively produced in the anode and cathode chambers are mixed to produce hypochlorite solution. In the production apparatus of hypochlorite solution, the anode chamber of the electrolytic cell is supplied with chloride solution through a supply conduit connected thereto, while the cathode chamber of the electrolytic cell is supplied with city service water through a supply conduit connected thereto.

5 Claims, 2 Drawing Sheets

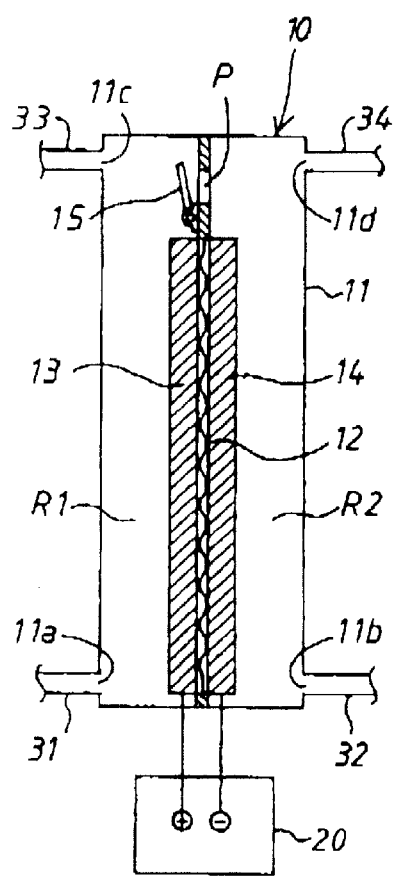
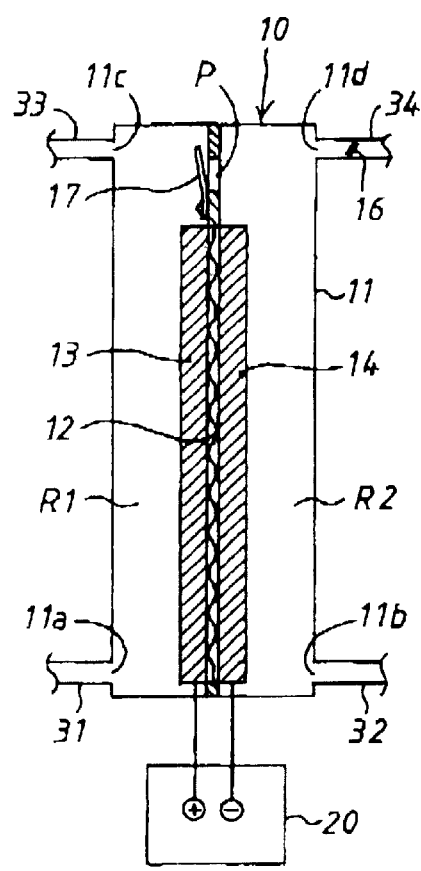

PRODUCTION APPARATUS OF HYPOCHLORITE SOLUTION

BACKGROUND OF THE INVENTION

1. Field of the Invention

The present invention relates to a production apparatus of hypochlorite solution in which acid water and alkaline water are produced by electrolysis of chloride solution such as sodium chloride solution, potassium chloride solution or the like and mixed to produce hypochlorite solution.

2. Discussion of the Prior Art

Disclosed in Japanese Patent Publication No. 4-42077 is a production apparatus of this kind which includes an electrolytic cell having a housing the interior of which is subdivided by a partition membrane to form anode and cathode chambers, and positive and negative electrodes respectively disposed within the anode and cathode chambers and opposed to each other through the partition membrane. In the electrolytic cell, the positive and negative electrodes are applied with DC voltage to effect electrolysis of chloride solution supplied into both the anode and cathode chambers, and acid water and alkaline water produced by electrolysis of the chloride solution respectively in the anode and cathode chambers are mixed to produce hypochlorite solution.

In the electrolytic cell, the chloride solution supplied into the cathode chamber is uselessly consumed for production of the hypochlorite solution, resulting in an increase of the production cost of hypochlorite solution.

SUMMARY OF THE INVENTION

It is, therefore, a primary object of the present invention to provide a production apparatus of hypochlorite solution capable of producing the hypochlorite solution at a low cost without useless consumption of the chloride solution.

According to the present invention, the object is attained by providing a production apparatus of hypochlorite solution which includes an electrolytic cell having a housing the interior of which is subdivided by a partition membrane to form anode and cathode chambers, and positive and negative electrodes respectively disposed within the anode and cathode chambers and opposed to each other through the partition membrane, wherein the positive and negative electrodes are applied with DC voltage to effect electrolysis of chloride solution supplied into both the anode and cathode chambers, wherein acid water and alkaline water produced by electrolysis of the chloride solution respectively in the anode and cathode chambers are mixed to produce hypochlorite solution, and wherein the anode chamber of the electrolytic cell is supplied with chloride solution through a supply conduit connected thereto, while the cathode chamber of the electrolytic cell is supplied with city service water through a supply conduit connected thereto.

As in the production apparatus of hypochlorite solution, the cathode chamber R2 is supplied with the city service water for production of hypochlorite solution in the electrolytic cell, the consumption amount of salt for preparation of the chloride solution can be reduced less than that in the conventional apparatus in which the chloride solution is supplied into both the anode and cathode chambers. This is useful to reduce the production cost of hypochlorite solution. In the case that the anode chamber is supplied with chloride solution of high concentration, a conductive degree of ion can be increased, and the voltage between the electrodes can be lowered.

In a practical embodiment of the present invention, it is preferable that flow restriction means is provided in the anode chamber to restrict an amount of the chloride solution supplied into the anode chamber. In such an embodiment, an amount of non-electrolyzed chloride solution can be decreased to enhance the electrolysis efficiency of the chloride solution.

It is also preferable that a discharge conduit is connected to the cathode chamber of the electrolytic cell to discharge alkaline water from the cathode chamber therethrough and that flow quantity control means is provided on the partition membrane to adjust an amount of the alkaline water flowing into the anode chamber from the cathode chamber therethrough. In such an embodiment, the mixture ratio of acid water and alkaline water produced respectively in the anode chamber and cathode chamber can be adjusted by operation of the flow quantity control means to adjust the concentration and pH of hypochlorite solution.

Alternatively, in a practical embodiment of the present invention, a discharge conduit is connected to the cathode chamber of the electrolytic cell to discharge therethrough alkaline water from the cathode chamber, a flow quantity control valve is disposed within the discharge conduit to adjust an amount of alkaline water discharged from the cathode chamber through the discharge conduit, and a check valve is provided on the partition membrane to interrupt the flow of alkaline water from the cathode chamber into the anode chamber. In such an embodiment, the amount of alkaline water discharged from the cathode chamber through the discharge conduit can be adjusted by the flow quantity control valve so that the flow amount of alkaline water from the cathode chamber into the anode chamber is controlled to adjust the mixture ratio of alkaline water and acid water thereby to adjust the concentration and pH of the hypochlorite solution in desired values. In addition, the flow of acid water from the anode chamber into the cathode chamber is interrupted by the check valve to restrain deterioration of the negative electrode in the cathode chamber caused by reaction with hydrogen ion contained in the acid water.

BRIEF DESCRIPTION OF THE DRAWINGS

Other objects, features and advantages of the present invention will be more readily appreciated from the following detailed description of a preferred embodiment thereof when taken together with the accompanying drawings, in which;

FIG. 3 is a vertical sectional view of a second modification of the production apparatus of hypochlorite solution; and FIG. 4 is a vertical sectional view a third modification of the production apparatus of hypochlorite solution.

DESCRIPTION OF THE PREFERRED EMBODIMENTS

Figure 1:
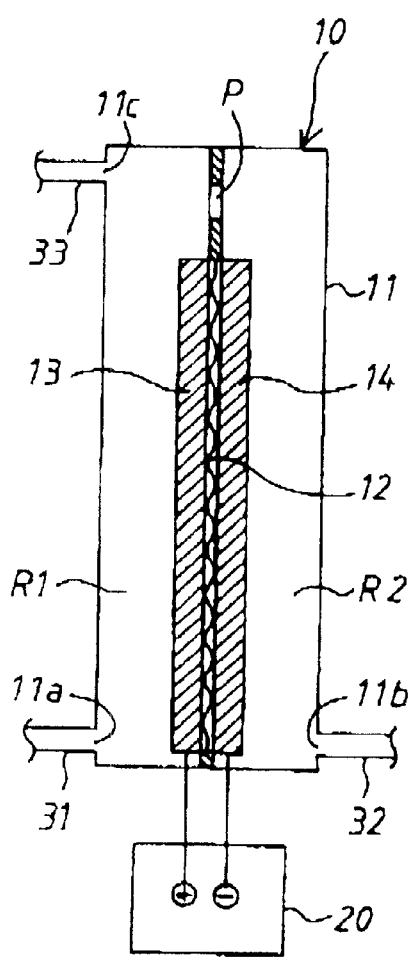
FIG. 1 is a vertical sectional view of a production apparatus of hypochlorite solution in accordance with the present invention.

Illustrated in FIG. 1 of the drawings is a preferred embodiment of a production apparatus of hypochlorite solution in accordance with the present invention which includes an electrolytic cell 10, a power source 20 of DC current, a brine supply conduit 31 connected to the electrolytic cell 10, a water supply conduit 32 connected to the electrolytic cell 10, and a discharge conduit 33.

The electrolytic cell 10 is composed of a housing 11 the interior of which is subdivided by a partition membrane 12 to form an anode chamber R1 and a cathode chamber R2, and positive and negative electrodes 13 and 14 respectively disposed in the anode chamber R1 and cathode chamber R2 and opposed to each other through the partition membrane 12. The housing 11 is provided at its bottom portion with a first inlet port 11a in open communication with the anode chamber R1 and a second inlet port 11b in open communication with the cathode chamber R2 and provided at its upper portion with an outlet port 11c in open communication with the anode chamber R1.

The partition membrane 12 is in the form of a conductive anode ion exchange membrane which is formed at its upper portion with a through hole P for communication between the anode chamber R1 and cathode chamber R2. The positive and negative electrodes 13 and 14 each are in the form of a meshed substrate made of a porous titanium and covered with sintered platinum. The positive and negative electrodes 13 and 14 are placed in contact with opposite surfaces of partition membrane 12. The positive electrode 13 is connected to a positive terminal of a power source 20 of DC current, while the negative electrode 14 is connected to a negative terminal of the power source 20.

The brine supply conduit 31 is connected at its one end to the first inlet port 11a of housing 11 and connected at its other end to a brine supply device (not shown) to supply brine of predetermined concentration (0.1 weight %) into the anode chamber R1. The water supply conduit 32 is connected at its one end to the second inlet port 11b of housing 11 and connected at its other end to a city service water pipe (not shown) to supply city service water into the cathode chamber R2. The discharge conduit 33 is connected to the outlet port 11c of housing 11 to discharge hypochlorite solution prepared by a mixture of acid water and alkaline water respectively produced in the anode chamber R1 and the cathode chamber R2.

In the production apparatus of hypochlorite solution described above, the brine is supplied into the anode chamber R1 through the brine supply conduit 31, while the city service water is supplied into the cathode chamber R2 through the water supply conduit 32. When the positive and negative electrodes 13 and 14 are applied with DC voltages to electrolyze the brine and city service water, acid water is produced in the anode chamber R1 while alkaline water is produced in the cathode chamber 2. The acid water flows toward the outlet port 11c in the anode chamber R1, while the alkaline water produced in the cathode chamber R2 flows into an upper portion of anode chamber R1 across the through hole P and is mixed with the acid water in the upper portion of anode chamber R1 to produce hypochlorite solution. Thus, the hypochlorite solution is discharged through the discharge conduit 33.

As the city service water is supplied into the cathode chamber R2 for production of hypochlorite solution in the electrolytic cell 10, the consumption amount of salt for preparation of the brine can be reduced less than that it the conventional apparatus in which the brine is supplied into both the anode and cathode chambers. This is useful to reduce the production cost of hypochlorite solution. In the case that the anode chamber R1 is supplied with brine of high concentration (10–20 weight %), a conductive degree of ion can be increased, and the voltage between the electrodes 13 and 14 can be lowered.

Figure 2:
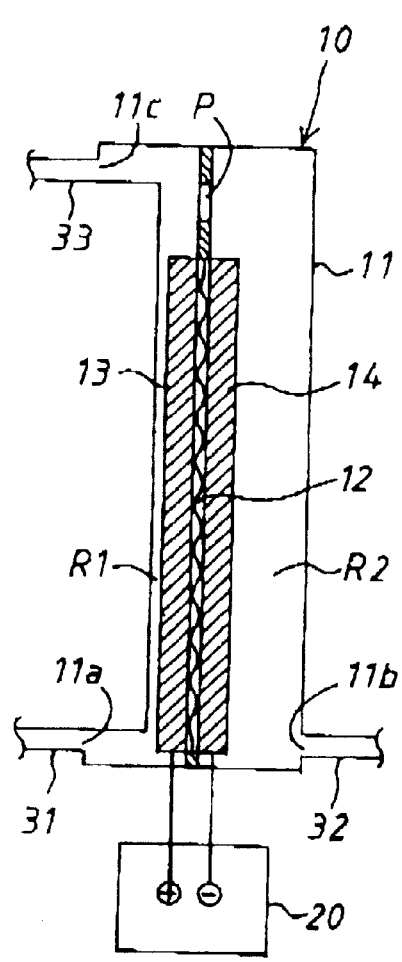
FIG. 2 is a vertical sectional view of a first modification of the production apparatus of hypochlorite solution.

Illustrated in FIG. 2 is a first modification of the production apparatus of hypochlorite solution, wherein the cavity formed behind the positive electrode 13 in the anode chamber R1 is narrowed to restrict the supply amount of brine into the anode chamber R1. In this modification, an amount of non-electrolyzed brine can be decreased to enhance the electrolysis efficiency of the brine. In a practical embodiment of the present invention, restriction means such as a throttle valve may be replaced with the narrowed cavity in the anode chamber R1.

Illustrated in FIG. 3 is a second modification of the production apparatus of hypochlorite solution, wherein an outlet port 11d is provided in open communication with an upper portion of the cathode chamber R2 and connected to a discharge conduit 34 for discharging alkaline water from the cathode chamber R2, and wherein a flow quantity control valve 15 is mounted to the partition membrane 12 to control the flow of alkaline water from the cathode chamber R2 into the anode chamber R1 across the through hole P. The flow control valve 15 is operated in an appropriate manner at the exterior of the electrolytic bath 10. In this second modification, the mixture ratio of acid water and alkaline water respectively produced in the anode chamber R1 and cathode chamber R2 can be adjusted by operation of the flow quantity control valve 15 to adjust the concentration and pH of hypochlorite solution. In this second modification, the capacity of anode chamber R1 may be reduced as in the first modification to enhance the electrolysis efficiency of the brine.

Illustrated in FIG. 4 is a third modification of the production apparatus of hypochlorite solution, wherein an outlet port 11d is provided in open communication with an upper portion of the cathode chamber R2 and connected to a discharge conduit 34 for discharging alkaline water from the cathode chamber R2, and wherein a flow quantity control valve 16 is disposed in the discharge conduit 34. In this third modification, a check valve 17 is mounted to the partition membrane 12 to interrupt the flow of acid water from the anode chamber R1 into the cathode chamber R2 across the through hole P. In this third modification, the amount of alkaline water discharged from the cathode chamber R2 through the discharged conduit 34 can be adjusted by the flow quantity control valve 16 so that the flow amount of alkaline water from the cathode chamber R2 into the anode chamber R1 across the opening P is controlled to adjust the mixture ratio of alkaline water and acid water thereby to adjust the concentration and pH of the hypochlorite solution in desired values. In addition, the flow of acid water from the anode chamber R1 into the cathode chamber R2 is interrupted by the check valve 17 to restrain deterioration of the negative electrode 14 in the cathode chamber R2 caused by reaction with hydrogen ion contained in the acid water. In this third modification, the capacity of anode chamber R1 may be reduced as in the first modification to enhance the electrolysis efficiency of the brine.

Although in the embodiment and modifications described above, the brine has been supplied as chloride solution into the anode chamber R1, other chloride solution such as potassium chloride solution may be supplied into the anode chamber R1. Although in the embodiment, the acid water and alkaline water have been mixed in the interior of electrolytic cell 10, the acid water and alkaline water may be mixed at the exterior of electrolytic cell 10 for production of hypochlorite solution.

What is claimed is:

1. A production apparatus of hypochlorite solution including an electrolytic cell having a housing the interior of which is subdivided by a partition membrane to form therein anode and cathode chambers, and positive and negative electrodes respectively disposed within the anode and cathode chambers and opposed to each other through the partition membrane, wherein the positive and negative electrodes are applied with DC voltage to effect electrolysis of chloride solution supplied into both the anode and cathode chambers, and wherein acid water and alkaline water respectively produced in the anode and cathode chambers are mixed to produce hypochlorite solution, wherein the anode chamber of the electrolytic cell is supplied with chloride solution through a supply conduit connected through the housing directly to the anode chamber, while the cathode chamber of the electrolytic cell is supplied with city service water through a supply conduit connected through the housing directly to the cathode chamber.

2. A production apparatus of hypochlorite solution as claimed in claim 1, wherein the anode chamber of the electrolytic cell is supplied with chloride solution of high concentration.

3. A production apparatus of hypochlorite solution including an electrolytic cell having a housing the interior of which is subdivided by a partition membrane to form therein anode and cathode chambers, and positive and negative electrodes respectively disposed within the anode and cathode chambers and opposed to each other through the partition membrane, wherein the positive and negative electrodes are applied with DC voltage to effect electrolysis of chloride solution supplied into both the anode and cathode chambers, and wherein acid water and alkaline water respectively produced in the anode and cathode chambers are mixed to produce hypochlorite solution, wherein the anode chamber of the electrolytic cell is supplied with chloride solution through a supply conduit connected thereto, while the cathode chamber of the electrolytic cell is supplied with city service water through a supply conduit connected thereto; and wherein flow restriction means is provided in the anode chamber to restrict an amount of the chloride solution supplied into the anode chamber of the electrolytic cell.

4. A production apparatus of hypochlorite solution including an electrolytic cell having a housing the interior of which is subdivided by a partition membrane to form therein anode and cathode chambers, and positive and negative electrodes respectively disposed within the anode and cathode chambers and opposed to each other through the partition membrane, wherein the positive and negative electrodes are applied with DC voltage to effect electrolysis of chloride solution supplied into both the anode and cathode chambers, and wherein acid water and alkaline water respectively produced in the anode and cathode chambers are mixed to produce hypochlorite solution, wherein the anode chamber of the electrolytic cell is supplied with chloride solution through a supply conduit connected thereto, while the cathode chamber of the electrolytic cell is supplied with city service water through a supply conduit connected thereto; and wherein a discharge conduit is connected to the cathode chamber of the electrolytic cell to discharge alkaline water from the cathode chamber, and wherein flow quantity control means is provided on the partition membrane to adjust an amount of the alkaline water flowing therethrough into the anode chamber from the cathode chamber of the electrolytic cell.

5. A production apparatus of hypochlorite solution including an electrolytic cell having a housing the interior of which is subdivided by a partition membrane to form therein anode and cathode chambers, and positive and negative electrodes respectively disposed within the anode and cathode chambers and opposed to each other through the partition membrane, wherein the positive and negative electrodes are applied with DC voltage to effect electrolysis of chloride solution supplied into both the anode and cathode chambers, and wherein acid water and alkaline water respectively produced in the anode and cathode chambers are mixed to produce hypochlorite solution, wherein the anode chamber of the electrolytic cell is supplied with chloride solution through a supply conduit connected thereto, while the cathode chamber of the electrolytic cell is supplied with city service water through a supply conduit connected thereto; and wherein a discharge conduit is connected to the cathode chamber of the electrolytic cell to discharge therethrough alkaline water from the cathode chamber, and a flow quantity control valve is disposed within the discharge conduit to adjust an amount of alkaline water discharged through the discharge conduit, and wherein a check valve is provided on the partition membrane to interrupt the flow of acid water from the anode chamber into the cathode chamber.

\* \* \* \* \*